(12) United States Patent
Blyth

(10) Patent No.: US 6,463,727 B2
(45) Date of Patent: Oct. 15, 2002

(54) HARVESTER TOOL

(76) Inventor: Gerald Samuel Blyth, 626 Bayview Dr., Woodlawn, Ontario (CA), K0A 3M0

(*) Notice: Subject to any disclaimer, the term of this patent is extended or adjusted under 35 U.S.C. 154(b) by 0 days.

(21) Appl. No.: 09/732,318

(22) Filed: Dec. 7, 2000

(65) Prior Publication Data

US 2001/0018822 A1 Sep. 6, 2001

(30) Foreign Application Priority Data

Dec. 30, 1999 (CA) .............................................. 2293859

(51) Int. Cl.⁷ .............................. A01D 7/00; E01H 5/12
(52) U.S. Cl. ...................................... 56/400.11; 294/51
(58) Field of Search ................................ 172/371, 375, 172/378; 56/400.01, 400.2, 400.11, 328.1, 400.13; 294/49, 51, 55.5

(56) References Cited

U.S. PATENT DOCUMENTS

| 3,688,483 | A |   | 9/1972  | Hamilton |             |
|-----------|---|---|---------|----------|-------------|
| 3,979,890 | A | * | 9/1976  | Schenk   | ... 56/328.1 |
| 4,009,560 | A |   | 3/1977  | Wells    |             |
| 4,244,168 | A |   | 1/1981  | Howard   |             |
| 4,299,079 | A |   | 11/1981 | Lambert  |             |
| 4,516,393 | A |   | 5/1985  | Lambert  |             |
| 4,644,740 | A |   | 2/1987  | Lee      |             |
| 4,821,500 | A |   | 4/1989  | MacIvergan |           |
| 4,888,942 | A |   | 12/1989 | Monaco   |             |
| 4,901,801 | A |   | 2/1990  | Popivalo |             |
| D306,682  | S |   | 3/1990  | Thompson |             |
| 4,970,853 | A |   | 11/1990 | Greene, III |          |
| 5,069,026 | A |   | 12/1991 | Johnson  |             |
| 5,142,855 | A |   | 9/1992  | Guidarelli |           |
| 5,383,696 | A | * | 1/1995  | Speier   | ............ 294/49 |
| 5,417,044 | A | * | 5/1995  | Russo    | ........ 56/400.11 |
| 5,509,259 | A |   | 4/1996  | Milbury  |             |
| 5,788,299 | A | * | 8/1998  | Wilkinson | ............ 294/51 |
| 5,791,706 | A | * | 8/1998  | Dolci    | ............ 294/51 |
| 5,816,632 | A | * | 10/1998 | Baldacci | ............ 294/51 |
| 6,131,381 | A |   | 10/2000 | Milbury  |             |

FOREIGN PATENT DOCUMENTS

CA   1116821   1/1982

OTHER PUBLICATIONS

Rake N' Fork, no date.
Power Rake, no date.
Polypelle Reversible Shovel, no date.

* cited by examiner

Primary Examiner—Robert E. Pezzuto
(74) Attorney, Agent, or Firm—Carmody & Torrance LLP

(57) ABSTRACT

A harvester push tool has a concave body portion with broad and flat fingers extending therefrom to facilitate the harvesting of grounded nuts or other items. Grounded nuts or fruit are those that have either naturally fallen to the ground or are on the ground as a result of mechanically shaking the tree during the harvesting process.

20 Claims, 6 Drawing Sheets

HARVESTER TOOL

FIELD OF THE INVENTION

This invention relates to harvester tools. The invention is particularly directed to manually operated harvester tools.

BACKGROUND OF THE INVENTION

Typical harvested items are: grounded nuts and fruit; acorns, pine cones, leaves, grass clippings, etc.; orchard tree pruning residue; commercial landscaping debris; small arms range (e.g., picking up of spent shotgun Shell casings); lawn thatch and aerating residue; wood chips, bark, twigs; crabapples, cherries, fallen fruit, etc.; rocks and stones; and pet/animal droppings (less dust is produced during pick-up).

The commercial harvesting of nuts is typically accomplished by mechanically shaking the nut tree and then gathering up the grounded nuts using large mechanized harvesters. Some varieties of nuts, such as the American Chestnut, are almost exclusively harvested, after naturally falling to the ground, by the use of the gloved hand. Presently, there are no mechanical harvesters or manual implements capable of efficiently collecting chestnuts.

Manual rakes, such as the garden and leaf variety, have also been used but these require considerable effort to grip and operate for long periods of time. They are normally pulled over the ground surface and require considerable effort since the tines penetrate the grass cover down to the base of the grass where thatch and roots exert significant resistance (the tines are the slender, projecting parts of the rake). Furthermore, a quantity of uprooted grass and thatch ends is unnecessarily collected along with any fruit If the rakes are used for collecting leaves then they do have a tendency to clog up by impaling leaves or other debris and can also pierce the soft fleshy covering when nuts are raked Furthermore, these rakes can produce blisters on even a gloved hand and quickly tire the worker's arms and back. The legs which are the strongest limbs of a human being are not effectively used for any purpose other than standing.

OBJECT OF THE INVENTION

It is an object of the present invention to provide a harvester tool in which the above-mentioned disadvantages are reduced or substantially obviated.

SUMMARY OF THE INVENTION

According to the present invention there is provided a harvester push tool for harvesting items comprising a concave body portion with integral outwardly tangentially extending fingers at its lower end, in use, adapted to slide over ground when the harvester tool is caused to travel in a direction in which the fingers extend from said concave body portion whereby harvested items are collected, said fingers being each of substantially rigid material and of such a width as not to bend unduly during said travel over said ground, and said fingers being substantially flat on their lower surface to facilitate passage over said ground.

BRIEF DESCRIPTION OF THE DRAWINGS

Embodiments of the invention will now be described, by way of example, with reference to the accompanying drawings in which.

The same reference numerals are used for like parts throughout the

DETAILED DESCRIPTION OF THE PREFERRED EMBODIMENTS

Referring to the figures, a concave body portion or blade 2 is provided with integral outwardly tangentially extending fingers 4 at its lower end. The body portion in side view substantially presents an arc of a circle and, in use, the fingers are adapted to slide over ground when the harvester tool is moved forward to pick up items such as nuts, apples or leaves. The fingers are each of substantially rigid material and of such a width as not to bend unduly during the travel over the ground.

Figure 1:
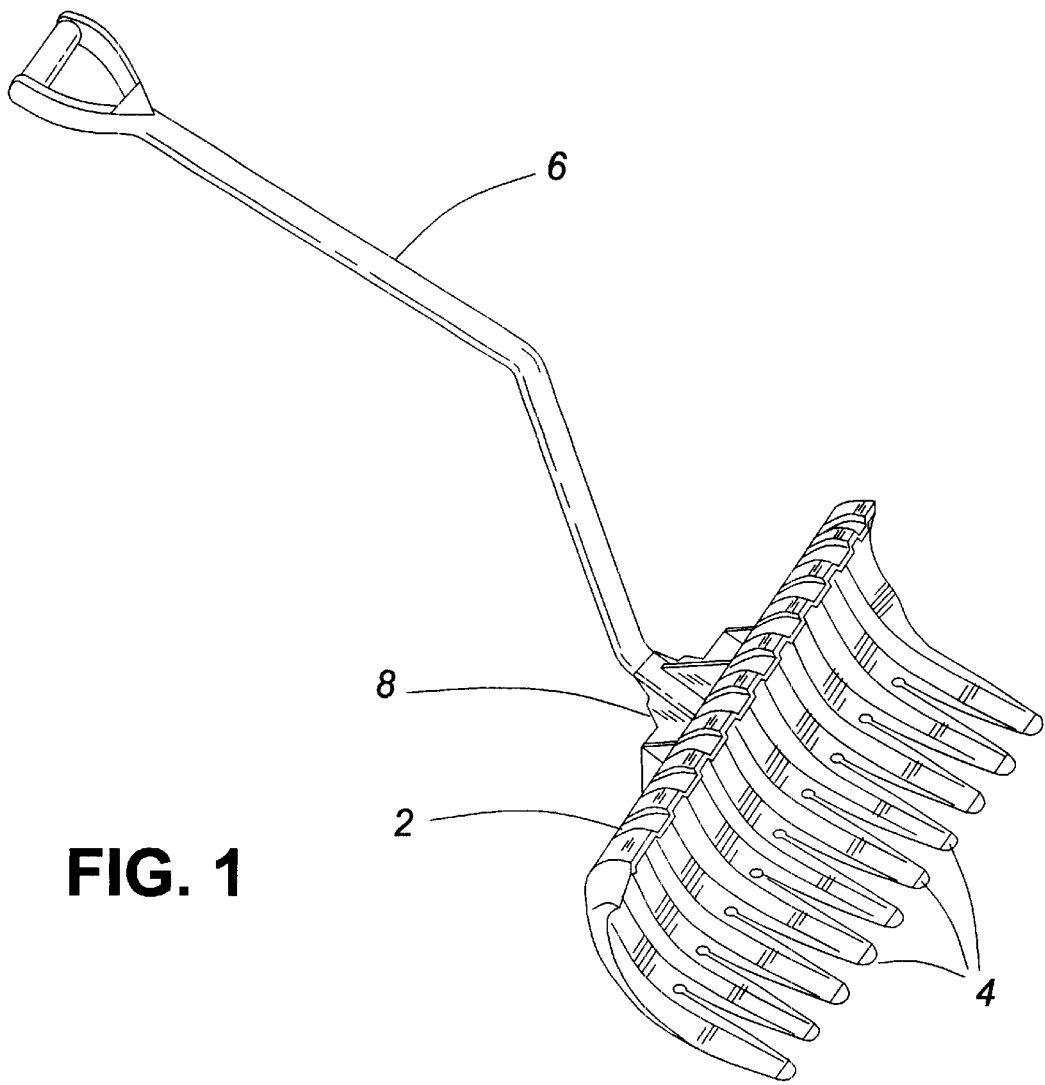
FIG. 1 is a perspective view of a harvester tool according to one embodiment of the present invention.

In FIG. 1 it will be seen that a handle 6 is provided extending rearwardly of the concave body portion. The concave body portion 2 is about 26 inches wide, about 10 inches high, and provided with a handle 6 fastened to a rearwardly facing gusset portion 8.

Figure 2:
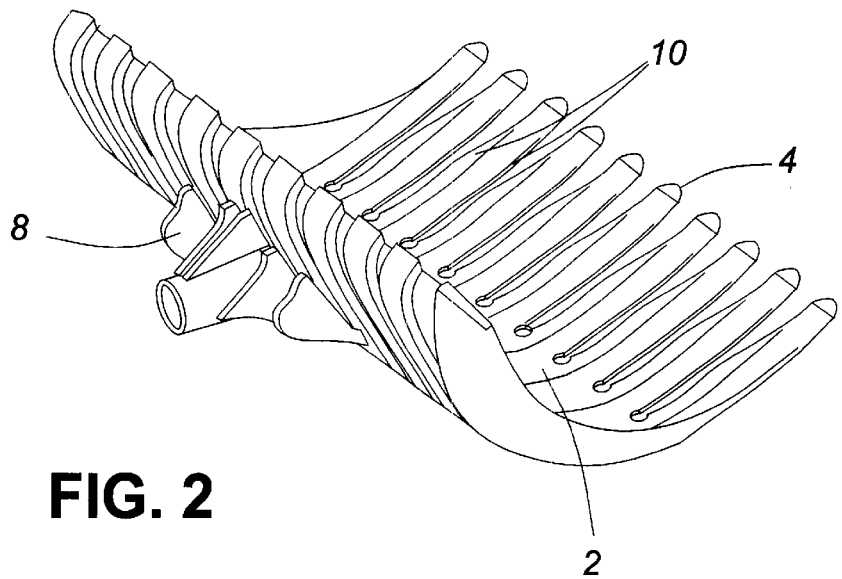
FIG. 2 is a frontal view of the body portion of the harvester tool of FIG. 1.
Figure 5:
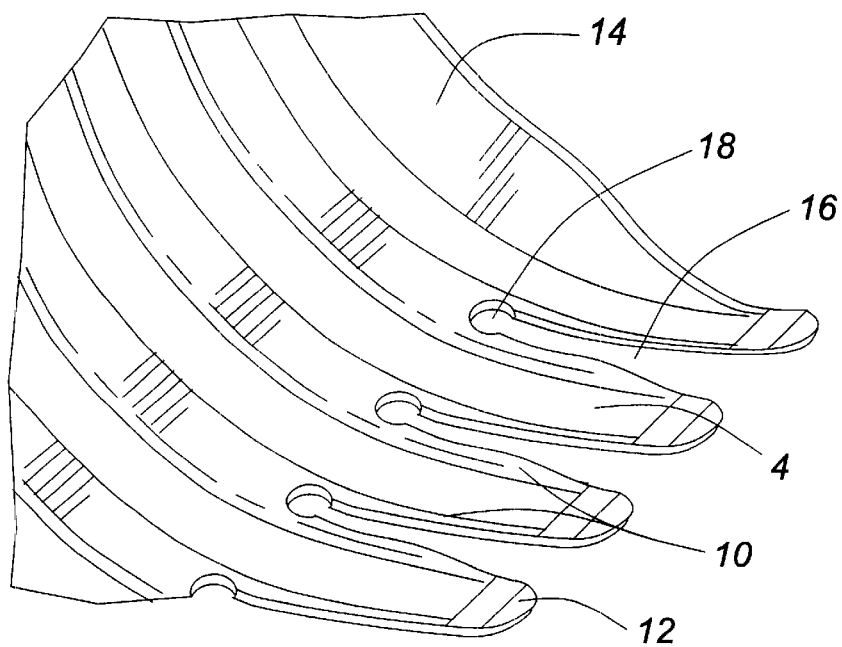
FIG. 5 is a view, on an enlarged scale, of the fingers of the harvester tool.

As shown in FIG. 2 and in FIG. 5, the finger 4 are formed with upturned side edges 10 to prevent items such as fruit or nuts from spilling off the side of the fingers The upturned sides 10 are outwardly curved as can be seen in FIG. 5 The tips 12 of the fingers 4 may be provided with round edges and may be slope-chamfered on the tip.

Blade wings 14 are provided on the outside edges of the body portion to prevent items, such as nuts, etc., from spilling off the sides of the body portion. The wings 14 are only about 1 inch high and are outwardly curved.

It will be seen that the space 16 between each finger 4 is so shaped as to be broader at the front than at the rear. At the rear the space 16 enlarges into a circular space 18 which is approximately 1½ inches higher than the front of space 16. This may be regarded as a spiral shape and facilitates the release of grass which may be pinched by the tool passing over the ground (not shown).

The fingers are broad, (for example, about 1½inches) and flat for about 3 inches at their ends, then curve upwards to join at a slightly rounded portion approximately 1½ inches from the bottom. Different breadth of fingers may be provided on the same tool, for example a middle finger about 6" wide. The leading part of the top surface of each finger may be slightly humped for approximately 1½ inch of the top surface to prevent some rocks, acorns, etc. from rolling off the front of the fingers.

Figure 3:
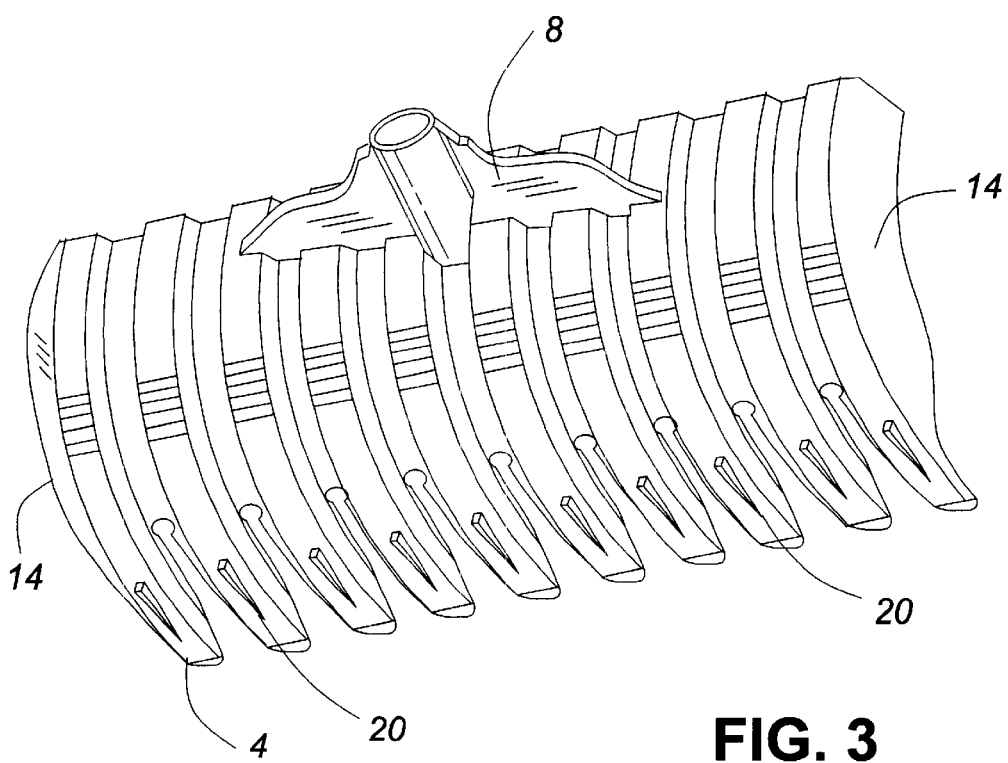
FIG. 3 is a rear view of the body portion of the harvester tool.

In FIG. 3 the rear of the fingers can be seen and they are provided with wear rails 20 which are about ⅛ inch wide and on the underside center of each of the fingers 4. These wear rails 20, sometimes called stiffening rails, usually taper in height from the loading edge of each finger to their full height of approximately ⅛ of an inch at about 4 inches back from the leading edge. They are shown on the center line of the finger but could be on an edge.

Figure 4:
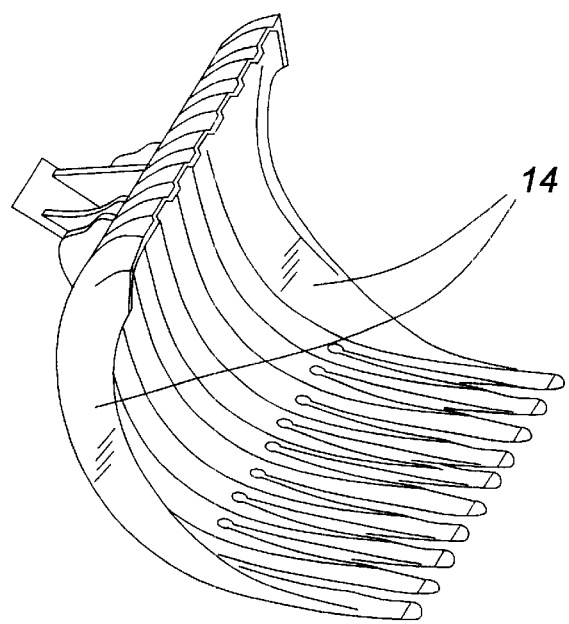
FIG. 4 is a side view of the body portion of the harvester tool.

The spiral notches of the fingers allow the blades of living grass to pass through whilst preventing items such as nuts from passing The nuts then collect in the body portion of the tool and remain there until the user dumps them where desired. The fingers are formed so as to turn upward after approximately 3 inches, joining at a portion approximately 1 ½ inches in height from the body bottom. FIG. 4 is a side view of the body portion to show the concave shape thereof.

Figure 6:
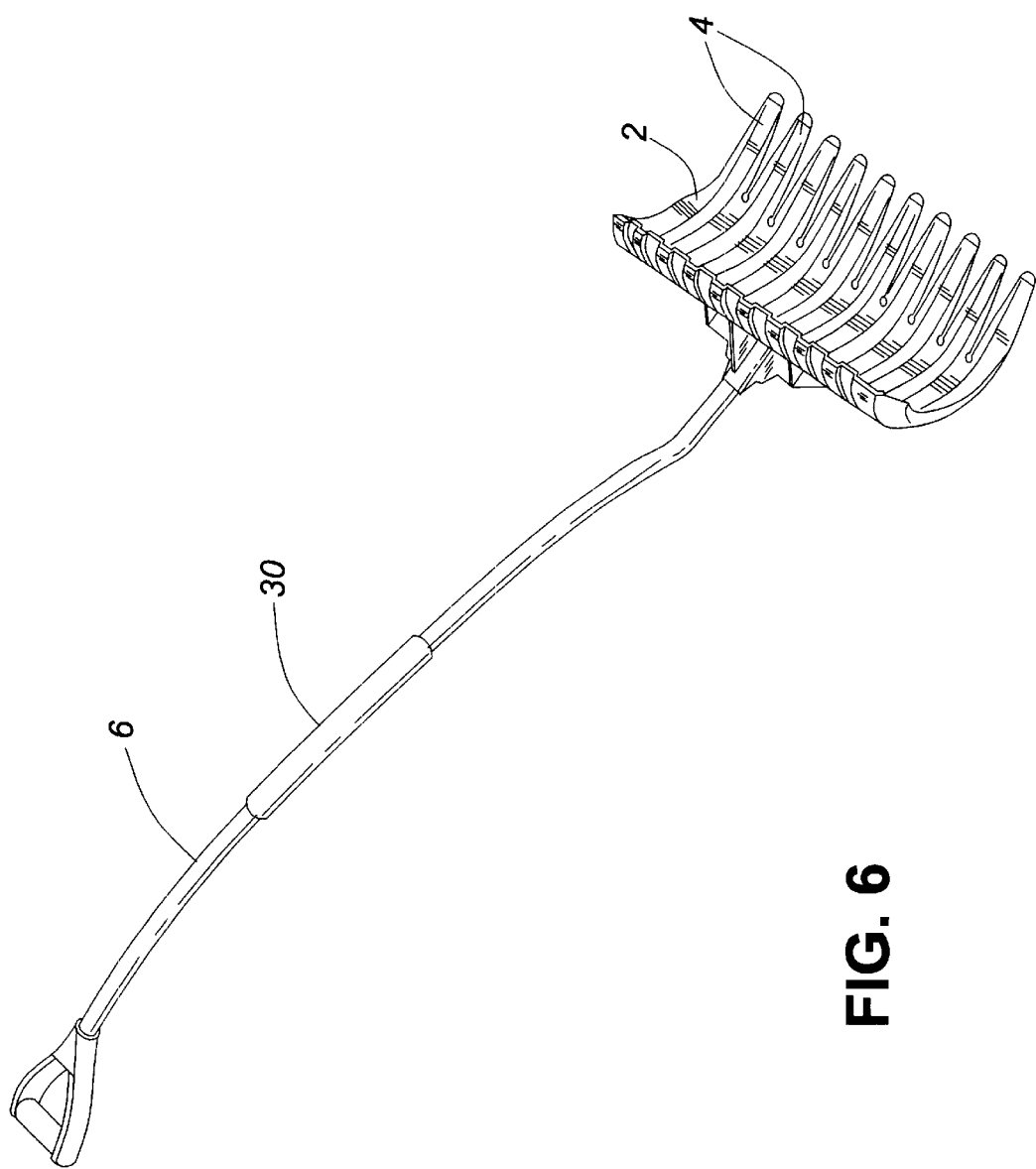
FIG. 6 is a perspective view of a harvester tool according to a second embodiment.

In FIG. 6 the harvester tool is provided with a substantially straight handle 6 having an intermediate softer cushion portion made of rubber, foam, or plastic, etc. The harvester tool may advantageously be made of plastic.

Figure 7:
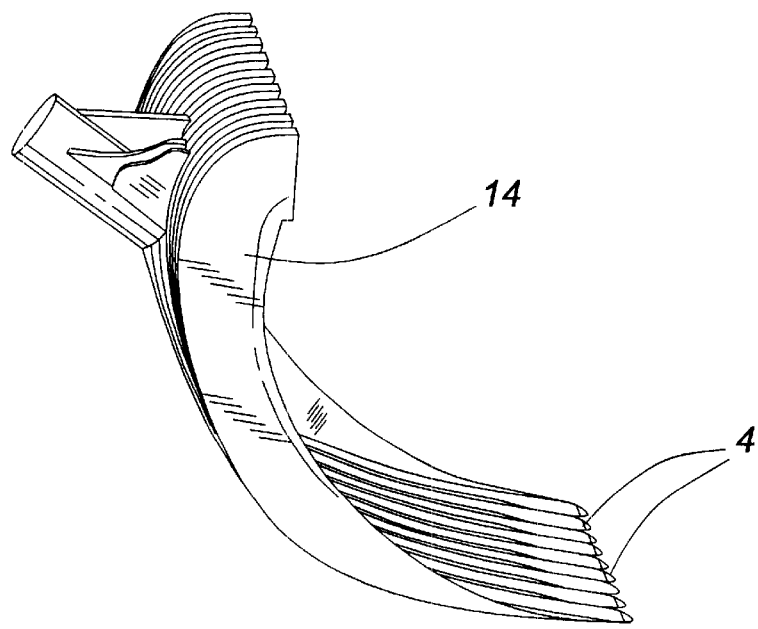
FIG. 7 is a side view of the harvester tool of FIG. 6 but at a slight angle.
Figure 8:
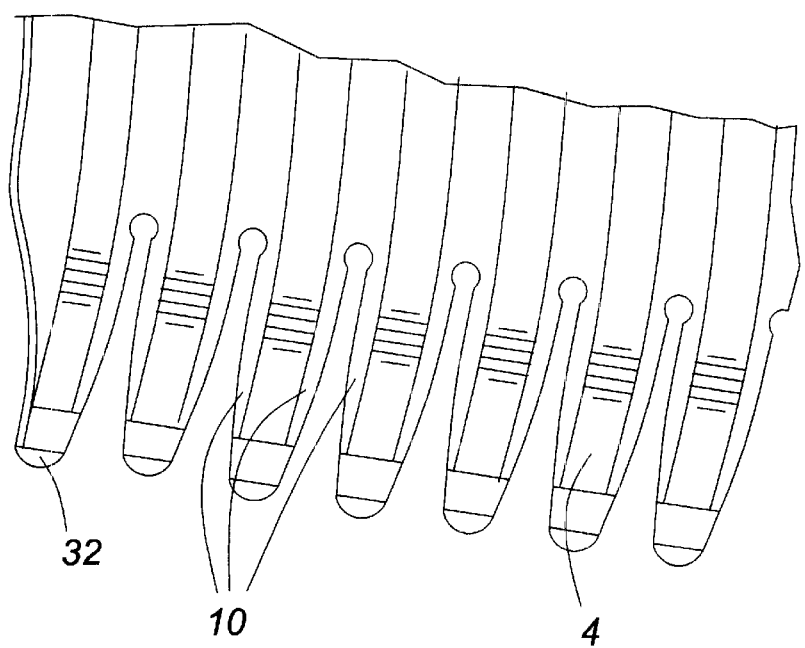
FIG. 8 is a view, on an enlarged scale, of the fingers of the harvester tool in FIGS. 6 and 7.

In FIG. 7 the body portion 2 of the harvester tool is shown with the fingers 4 and blade wings 14 whilst in Figure a details of the fingers can be more clearly seen. The fingers 4 are rounded at their ends, i.e. their leading edges, and bevelled down at their tips 32 from ⅛" to 1/16". The upturned sides 10 are tapered, as can be seen in FIG. 8, so that nuts, etc. are caused to fall into the channels on the Fingers 4.

Figure 9:
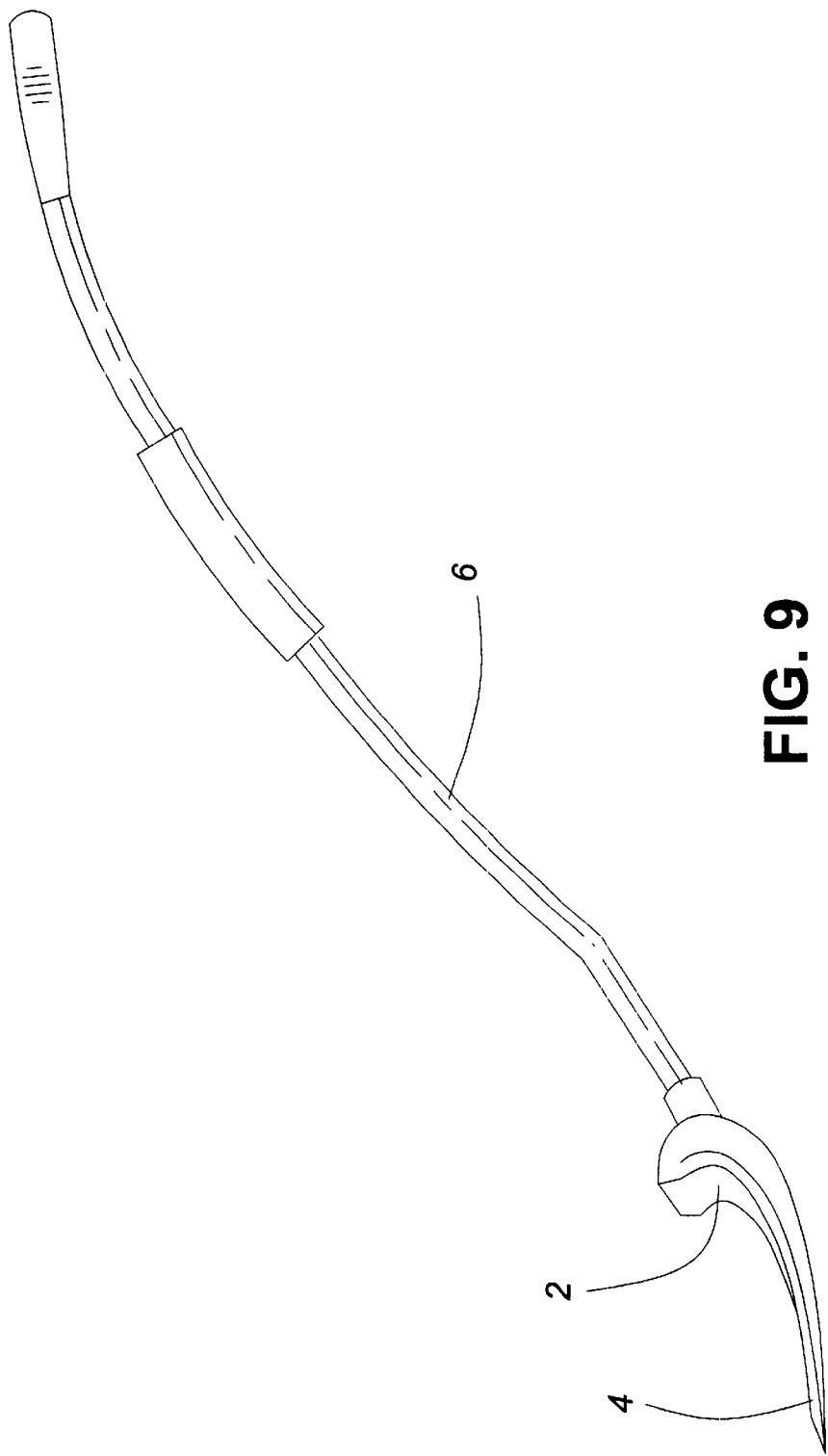
FIG. 9 is a side view of another embodiment of the invention.

In FIG. 9 the body portion 2 is in the shape of part of an ellipse. It is less in height than the embodiment of FIG. 1 being only 6 inches instead of 10 inches. It presents a more squat appearance.

The described embodiments are of a manual harvester push tool but it will be understood that the tool may be constructed with different dimensions and may be readily adapted for a machine harvester. Due to the fingers being broad they ride on the surface of grass which is thus only squeezed and then springs back. With rakes the tines press into grass.

The shape of the described harvester tool facilitates scooping (or shovelling) of fruit or debris, etc. which is collected. This avoids the provision of an additional tool such as a shovel.

It will be readily apparent to a person skilled in the art that a number of variations and modifications can be made without departing from the true spirit of the invention which will now be pointed out in the appended claims .

What is claimed is:

1. A harvester push tool for harvesting items comprising: a concave body portion with integral outwardly tangentially extending fingers at its lower end, in use, adapted to slide over ground when the harvester tool is caused to travel in a direction in which the fingers extend from said concave body portion whereby harvested items are collected, said fingers being each of substantially rigid material and of such a width as not to bend unduly during said travel over said ground, and said fingers being substantially flat on their lower surface to facilitate passage over said ground, and wherein each finger includes upturned sides defining a channel therebetween thereby preventing items from spilling off said sides of the respective finger.

2. The harvester tool of claim 1 wherein the fingers are broad and substantially flat on their upper surface.

3. The harvester tool of claim 2 wherein said fingers are broad and flat for about 3 inches at their ends, then curve upwards and backwards to join at a slightly rounded part of the body portion approximately 1½ inches vertically above the lower surface of said fingers in use.

4. The harvester tool of claim 1 wherein the body portion has wings which substantially prevent harvested items from spilling off the sides of the body portion.

5. The harvester tool of claim 4 wherein the wings are located on the outside of the body portion and are approximately 1 inch high and outwardly curved.

6. A harvester tool according to claim 1 wherein the top surface of said fingers are slightly humped at their ends.

7. A harvester tool according to claim 1 wherein a wear rail is provided on the lower surface of each finger.

8. A harvester tool according to claim 7 wherein each wear rail tapers in height from the leading edge of each finger to a full height of approximately ⅛ of an inch at approximately 4 inches back from the leading edge.

9. A harvester tool according to claim 1 wherein said fingers are bevelled down from ⅛ inch to 1/16 inch at their ends.

10. A harvester tool according to claim 7 wherein said fingers are bevelled down from ⅛ inch to 1/16 inch at their ends.

11. A harvester tool according to claim 1 wherein said upturned sides are tapered so that items are caused to fall into said channel.

12. A harvester tool according to claim 1 wherein the space between each pair of fingers is so shaped as to be broader at the front than at the rear.

13. A harvester tool according to claim 11, wherein said space between each pair of fingers enlarges into a circular space at the rear to facilitate the release of pinched grass on said ground.

14. A harvester tool according to claim 1 wherein said body portion in side view is an arc of a circle.

15. A harvester tool according to claim 1 which is a manually-operated push tool.

16. A harvester tool according to claim 1 wherein said body portion in side view is elliptical.

17. A nut harvester push tool for harvesting nuts comprising: a concave body portion with integral outwardly tangentially extending fingers at its lower end, in use, adapted to slide over ground when the harvester tool is caused to travel in a direction in which the fingers extend from said concave body portion whereby harvested nuts are collected, said fingers being each of substantially rigid material and of such a width as not to bend unduly during said travel over said ground, said fingers being substantially flat on their lower surface to facilitate passage over said ground, and wherein each finger includes upturned sides defining a channel therebetween thereby preventing items from spilling off said sides of the respective finger.

18. A harvester tool according to claim 17 wherein said body portion in side view is an arc of a circle.

19. A harvester tool according to claim 17 which is a manually-operated push tool.

20. A harvester tool according to claim 17 wherein said body portion in side view is elliptical.

* * * * *